US008156565B2

(12) United States Patent
MacDonald et al.

(10) Patent No.: US 8,156,565 B2
(45) Date of Patent: Apr. 10, 2012

(54) HARDWARE-BASED PROTECTION OF SECURE DATA

(75) Inventors: Donald Scott MacDonald, Redmond, WA (US); Steve Pronovost, Redmond, WA (US); David R. Blythe, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 12/110,478

(22) Filed: Apr. 28, 2008

(65) Prior Publication Data

US 2009/0316889 A1 Dec. 24, 2009

(51) Int. Cl.
*G06F 7/04* (2006.01)
*G06F 17/30* (2006.01)
*H04N 7/16* (2011.01)

(52) U.S. Cl. ........................................................ 726/27
(58) Field of Classification Search .................. None
See application file for complete search history.

(56) References Cited

U.S. PATENT DOCUMENTS

| | | | | |
|---|---|---|---|---|
| 5,915,018 | A * | 6/1999 | Aucsmith | 380/201 |
| 6,064,739 | A | 5/2000 | Davis | |
| 6,731,756 | B1 | 5/2004 | Pizano | |
| 7,055,038 | B2 * | 5/2006 | Porter et al. | 713/193 |
| 7,093,295 | B1 | 8/2006 | Saito | |
| 7,110,542 | B1 | 9/2006 | Tripathy | |
| 7,197,648 | B2 * | 3/2007 | Evans | 713/189 |
| 7,203,310 | B2 | 4/2007 | England | |
| 7,293,178 | B2 | 11/2007 | Evans | |
| 7,502,470 | B2 * | 3/2009 | Hanko et al. | 380/200 |
| 7,788,505 | B2 * | 8/2010 | Porter et al. | 713/193 |
| 2002/0012432 | A1 | 1/2002 | England | |
| 2002/0120854 | A1 * | 8/2002 | LeVine et al. | 713/189 |
| 2002/0126843 | A1 * | 9/2002 | Murase et al. | 380/201 |

(Continued)

OTHER PUBLICATIONS (No Author Listed) "i.MX31 Multimedia Applications Processors," Freescale Simiconductor, Jul. 5, 2005,1 p.; http://www.freescale.com/webapp/sps/site/overview.jsp?nodeId=02XPgQ8217297336425774.
Alessandra Cameiro, "Leadtek Unveils WinFast PX8800 ULTRA," Hardware Secrets Catalog, May 28, 2007, 8 pp.; http://www.hardwaresecrets.com/news/cat/3/15/4.
Debra Cook, Ricardo Baratto, and Angelos Keromytis, "Remotely Keyed CryptoGraphics: Secure Remote Display Access Using (Mostly) Untrusted Hardware", Proceedings of the Seventh International Conference on Information and Communications Security (ICICS 2005), Beijing, China, Dec. 10-13, 2005, pp. 363-375.

(Continued)

*Primary Examiner* — Vivek Srivastava
*Assistant Examiner* — Jayesh Jhaveri
(74) *Attorney, Agent, or Firm* — Shook Hardy & Bacon LLP

(57) ABSTRACT

Computer-readable media, computerized methods, and computer systems for protecting secure data by writing content of the secure data to a protected memory segment are provided. Initially, streaming media is received from a media-reading device and portions of the streaming media are identified as secure data. A data-management process to protect content within the secure data is executed. During execution, the protected memory segment is instantiated, a region of memory is dynamically allocated to hold the protected memory segment, and content of the secure data is written thereto. The protected memory segment is generally a data store that conditionally limits access thereto utilizing hardware-based rules, thereby guarding the content against exposure to unauthorized systems and to attackers. The region of memory may be allocated on CPU hardware, GPU hardware, or a combination thereof. The content may then be encrypted and released for conveyance to one or more presentation devices.

17 Claims, 8 Drawing Sheets

U.S. PATENT DOCUMENTS

| | | | |
|---|---|---|---|
| 2005/0123135 A1* | 6/2005 | Hunt et al. | 380/200 |
| 2005/0154903 A1* | 7/2005 | Evans | 713/189 |
| 2005/0168472 A1* | 8/2005 | Gosalia et al. | 345/543 |
| 2006/0123248 A1* | 6/2006 | Porter et al. | 713/193 |
| 2007/0136546 A1* | 6/2007 | Krauss | 711/170 |
| 2007/0220279 A1 | 9/2007 | Northcutt | |
| 2008/0049036 A1* | 2/2008 | Chang | 345/558 |
| 2009/0080665 A1* | 3/2009 | Patel | 380/287 |
| 2009/0193266 A1* | 7/2009 | Gable et al. | 713/193 |
| 2009/0220080 A1* | 9/2009 | Herne et al. | 380/255 |

* cited by examiner

HARDWARE-BASED PROTECTION OF SECURE DATA

CROSS-REFERENCE TO RELATED APPLICATIONS

This application is related to U.S. application Ser. No. 12/124,899 filed May 21, 2008, now pending, entitled "HARDWARE-BASED OUTPUT PROTECTION OF MULTIPLE VIDEO STREAMS," herein incorporated by reference.

STATEMENT REGARDING FEDERALLY SPONSORED RESEARCH OR DEVELOPMENT

Not applicable.

BACKGROUND

Various techniques exist that allow malicious entities, or attackers, to access and copy video content as it is being streamed through a computing device. Common types of attacks include copying the video content to system memory on a frame-by-frame basis, depressing a "Print Screen" key, copying with a graphics device interface GetDC function, utilizing DirectX calls, attacking video content crossing User Accessible Bus (UAB), or disabling the output protection such that the digital or analog output signals carrying the video content can be recorded. Typically, these "attacks" on the video content are unauthorized; thus, content providers of the video content are deprived of sales and, consequently, income. As such, preventing such attacks on the video content generated by these content providers is of great significance thereto.

In one solution, many video sources contain various licenses attached thereto that strictly require video content streaming from the video sources to be protected. Examples of these video sources that promote such requirements include Advanced Access Control System (AACS) playback (e.g., high-definition digital versatile disc (HD DVD), Blu-Ray Disc, and the like), DirecTV, Open Cable Unidirectional Receiver (OCUR), and international broadcast standards governing protections of video content. These requirements typically cover three different areas: protecting the keys used to decipher the video content when encrypted, protecting the video content once it is decrypted, and enforcing content specific policy such as applying an output protection technology to protect an output signal carrying the video content (e.g., High-bandwidth Digital Content Protection (HDCP), Macrovision®, Copy Generation Management System-Analog (CGMS-A)).

However, trusted traditional approaches for securing video content only partially protect the video content. For instance, one traditional approach is applying software security techniques to the video content. These software security techniques cannot guarantee the integrity of the video content as it passes between interconnected components within a computing device. For example, software security techniques are frequently defeated by malicious code that clears protective flags attached to the video content. Accordingly, these software security techniques, at times, can be bypassed and expose de-encrypted media within the video content to non-trusted systems (e.g., operating system, drivers, unsecured memory, and other unlocked environments), which allow creation of unauthorized copies of the de-encrypted media.

Software security techniques that attempt to tightly protect video content by increasing obfuscation, such as applying security variables to the video content, or applying additional routines that resist a downstream attack once video content is decrypted, are not always effective and have a very high performance overhead associated therewith. The high performance overhead will slow down the security software and cause delays when rendering at graphical displays. Hence, the software security techniques, or other software-based protection mechanisms, do not offer sufficiently robust security while maintaining performance.

In another instance, a second traditional approach is to utilize a graphics processing unit (GPU) to protect the video content. But, because the GPU can address substantially all of the memory within a computing device, including protected memory and non-protected memory, access points to the GPU must be gated by security checks to ensure that protected content is not improperly accessed. Due to the high frequency at which GPUs are accessed for rendering purposes, the impact of implementing these security checks on performance is unacceptable.

Accordingly, present schemes for protecting video content against downstream attacks remain inefficient and deliberate in execution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to computer-readable media, computer systems, and computerized methods for providing hardware-based protection of content of streaming media. Generally, providing hardware-based protection is accomplished by managing dynamic allocation of regions of hardware memory to provide protected memory segments capable of storing secure data (e.g., digital video content from a DVD player) carried within streaming media being processed by a computing device. Initially, the streaming media is received from a media-reading device and a rate of flow of the streaming media is identified. This triggers a protected memory segment to be instantiated for receiving the secure data within the streaming media. This protected memory segment may reside on a memory region, e.g., within the system memory, the video memory, or a combination thereof, dynamically allocated by a memory manager for the secure data based on the identified rate of flow.

The secure data is then written (i.e., temporarily stored) to the protected memory segment. In embodiments, writing includes decompressing and deciphering the secure data from an encrypted format such that it is decrypted when stored. The secure data may be stored as decrypted content as the protected memory segment is impervious to attacks by utilizing a set of hardware-based rules. When applied, the hardware-based rules conditionally limit access to the protected memory segment by obfuscating the protected content (e.g., clearing or generating black images) to return a null presentation when rendered at a presentation device if unauthorized activity is detected. This unauthorized activity includes, but is not limited to, any one of the following: reading from the protected memory segment by an authorized source, releasing the secure data for presentation without applying encryption, illicitly copying the secure data by the operating system (OS) to a location that is not the protected memory segment, or exposing the secure content if the boundaries of the protected memory segment are decreased below a threshold.

The secure data may then be released from the secure memory segment for rendering on a presentation device. Typically, releasing includes pushing content within the secure data to a frame buffer based on the rate of flow of the streaming data and scanning out the content to the presentation device for display to a user. In embodiments, the frame buffer is visible to the presentation devices communicatively coupled to outputs of the computing device, but the content stored in the frame buffer is protected by the hardware-based rules, as discussed above. Accordingly, pushing content generally includes recognizing a type of the presentation device (e.g., digital monitor, analog set top box, commuting device, and the like), and applying encryption to the content based on the type of the presentation device prior to eviction thereto.

In other embodiments of the present invention, hardware-based protection is provided for multiple media streams. This protective scheme is accomplished by managing the dynamic allocation of a plurality of protected memory segments for content of secure data. Initially, managing includes recognizing media streams being communicated from media-reading devices, identifying secure data within the media stream, and detecting modes of encryption applied to each of the media streams. Typically, detecting modes of encryption includes identifying a license attached to each media stream that defines the mode of encryption associated therewith, and determining the standards of output protection that are encompassed by the license. Upon identifying the secure data, a memory manager component dynamically allocates protected source segments within system memory or video memory for, at least temporarily, writing the secure data received within the streaming media. These protected source segments are associated with the detected mode of encryption.

In addition, the memory manager component may identify the presentation devices that are communicatively coupled to outputs of the computing device. Standards of output protection supported by these presentation devices are determined. Accordingly, protected target segments that apply each respective standard of output protection are dynamically generated by allocating the system memory or the video memory for, at least temporarily, writing the secure data pushed from the protected source segments. The protected source segments and the protected target segments may be mapped together according to whether the mode of encryption corresponds with the standard of the output protection. As discussed above, the protected source segments and the protected target segments protect the secure data by hardware-based rules. These rules ensure that secure content may not be copied from a protected source segment to another location besides the correlating protected target segment as delineated by the mapping. Accordingly, the conditions of the license attached to the streaming media are met.

BRIEF DESCRIPTION OF THE DRAWINGS

The present invention is described in detail below with reference to the attached drawing figures, wherein.

DETAILED DESCRIPTION

Figure 1:
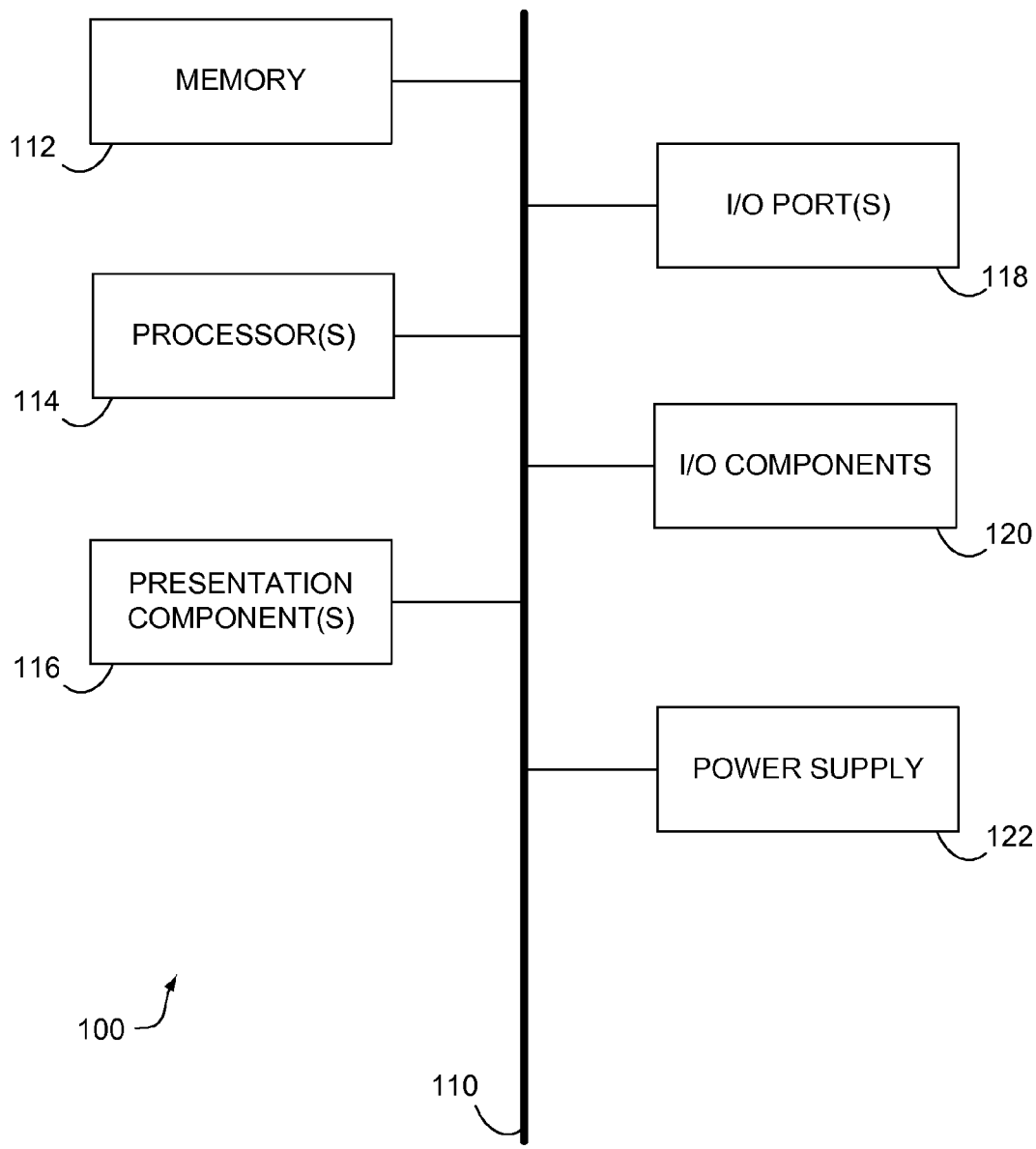
FIG. 1 is a block diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide to computer-readable media, computer systems, and computerized methods for providing hardware-based protection of content of streaming media, thereby establishing protected memory segments within a computing device that securely stores the content when streaming from a media-reading device to one or more presentation devices. The protected memory segments (e.g., protected source segments, protected target segments, and other secure hardware environments) employ hardware measures to prevent unauthorized access to the content stored therein and generally block attack vectors exercised by malicious entities without relying on cryptographic techniques to ensure a protection status. Accordingly, this approach for protecting content is very robust in comparison to traditional software techniques and graphics processing unit (GPU) defenses, as discussed above, which exhaust computing resources and can be defeated by software techniques.

Accordingly, in one aspect, the present invention provides one or more computer-readable media that has computer-executable instructions embodied thereon that, when executed, perform a method for protecting secure data by writing content of the secure data to a protected memory segment. In embodiments involving a single media stream, the method includes, in part, receiving streaming media from a media-reading device, identifying portions of the streaming media as secure data, and executing a data-management process to protect content within the secure data. Generally, the data-management process includes allocating a region of memory to provide the protected memory segment to accept the identified secure data, and, at least temporarily, storing the content of the secure data at the protected memory segment. Typically, the protected memory segment is a data store that conditionally limits access thereto utilizing a set of hardware-based rules. Additionally, allocating the region of memory may include, but is not limited to, establishing the protected memory segment, determining a rate of flow of the streaming media, and dynamically manipulating the allocation of the region of memory to provide the protected memory segment based on the rate of flow. In general, memory comprises at least one of system memory, video memory, or a combination of the system memory and the video memory. Incident to storage, the content is released from the protected memory segment for conveyance to one or more presentation devices.

In embodiments involving multiple video streams, the method includes, in part, providing hardware-based output protection to each of the multiple video streams. In particular, the method includes, in part, receiving streaming media from one or more media-reading devices, identifying portions of the streaming media as secure data, and detecting a mode of encryption applied to the secure data. Next, or in parallel with the steps mentioned above, a data-management process is executed to protect the secure data. Typically, the data-management process includes, dynamically allocating a region of memory to provide one or more protected source segments, dynamically allocating a region of memory to provide one or more protected target segments, and temporarily writing the secure data to the associated protected source segments and the associated protected target segments for conveyance to one or more presentation devices. Accordingly, each of the protected source segments is associated with the streaming media from each of the media-reading devices, and each of the protected target segments is associated with each of the presentation devices. A type of the presentation device may be recognized based on the capabilities or the limitations thereof, and a standard of output protection may be determined based on the type.

As a result, the protected target segments may be mapped to the protected source segments based on a comparison of the mode of encryption applied to the secure data by the media-reading devices and the standard of output protection supported by the presentation devices. Based on the mapping, the secure data is pushed from the protected source segments to the protected target segments according to a rate of flow of the streaming media. Typically, the secure data in the one or more protected target segments is visible to the presentation devices, but is protected by a set of hardware-based rules. Encryption is applied to secure data prior to eviction from the protected target segment, and eviction typically includes scanning out the secure data to the presentation devices for rendering.

In another aspect, a computerized method is provided for managing dynamic allocation of regions of memory to provide protected memory segments for storing secure data. In an embodiment involving a single media stream, the method includes, but is not limited to, receiving streaming media from a media-reading device, identifying a rate of flow of the streaming media and that the secure data is carried thereby, and instantiating a protected memory segment for receiving the secure data from the first media-reading device. Typically, the first protected memory segment conditionally limits access to the secure data residing therein. Regions of memory are dynamically allocated to provide hardware memory space for the protected memory segment based on the rate of flow. Generally, the memory may include video memory, system memory, or a combination thereof. The secure data may be written to the protected memory segment, and subsequently released from the protected memory segment for conveyance to one or more presentation devices. In one instance, releasing includes, in part, recognizing a type of the presentation devices receiving the streaming media, and applying encryption to the streaming media according the type of the presentation devices.

In embodiments involving multiple media streams, the computerized method is designed for managing dynamic allocation of one or more protected memory segments for storing content of secure data. In particular instances, the method includes the following procedures: recognizing a media stream being communicated from a media-reading device by identifying secure data within the media stream, and detecting a mode of encryption applied to the streaming media; dynamically allocating protected source segments within system memory or video memory for, at least temporarily, writing the secure data received within the streaming media; and associating the protected source segment with the media stream based on the detected mode of encryption. A standard of output protection of the media stream that is supported by a presentation device selected for receiving the media stream is identified. Protected target segments are dynamically allocated within system memory or video memory for, at least temporarily, writing the secure data pushed from the protected source segments. These protected target segments are associated with the presentation device based on the standard of output protection that is applied by the protected target segments. Accordingly, the associated protected source segment may be mapped to the associated protected target segment based on whether the mode of encryption corresponds with the standard of the output protection. The media stream may then be evicted to the presentation device such that the secure data is rendered thereby.

In yet another aspect, embodiments of the present invention relate to a computer system for applying a set of hardware-based rules to content that is written to a protected memory segment. The computer system generally includes an application, a driver, a memory manager, a protected memory segment, an output-protection component, and memory to temporarily store streaming media, which may be at least one of system memory, video memory, or a combination thereof. Initially, the application receives the media streaming from a media-reading device and identifies secure data within the streaming media. The driver component specifies a type of memory to which content within the streaming media is to be written. The memory manager allocates memory for the protected memory segment to, at least temporarily, store the content of the secure data. Typically, allocating memory includes determining a rate of flow of the streaming media, and dynamically allocating the memory for the protected memory segment according to the rate of flow by identifying a region of the memory available on the system memory, the video memory, or the combination of the system memory and the video memory. The protected memory segment protectively holds the content and denies unauthorized access to the content by enforcing the set of hardware-based rules. The output-protection component applies encryption to the content upon releasing the content to one or more presentation devices.

In embodiments involving multiple media streams, the computer system manages a mapping between a plurality of protected source segments and a plurality of protected target segments. Generally, the computer system includes, in part, an application, a memory manager component, one or more presentation devices, a policy manager, protected source segments, and protected target segments. Initially, the application receives media streaming from media-reading devices and identifies secure data within the streaming media. The memory manager component dynamically allocates protected source segments within system memory or video memory for, at least temporarily, writing the secure data received within the streaming media and dynamically allocates protected target segments within system memory or video memory for, at least temporarily, writing the secure data pushed from the protected source segments. In one instance, the memory manager component is further configured for determining a rate of flow of the streaming media, and for dynamically manipulating a region of the video memory or the system memory allocated for the protected source segments according to the rate of flow.

Generally, the protected source segments temporarily store the secure data of the media streams associated thereto, where modes of encryption attached to the media streams are deciphered precedent to entering the protected source segments such that the stored secure data is decrypted information. In addition, the protected source segments push the decrypted information to the protected target segments as mapped by the mapping interface component. The mapping interface component temporarily maintains a correlation of the protected source segments to the protected target segments on a hardware mapping scheme accessible to a graphics processing unit (GPU).

The policy manager component manages the flow of the streaming media from the protected source segments to the protected target segments, while the presentation devices render the streaming media. Typically, managing includes associating the protected source segments with the streaming media based on detected modes of encryption applied to the streaming media, associating the protected target segments with the one or more presentation devices based on standards of output protection that are supported by the one or more presentation devices, and mapping the protected source segments to the protected target segments according to whether the modes of encryption correspond with the standards of the output protection. In addition, the policy manager component is further configured to query the protected target segments to verify which of the presentation devices are evicting the secure data therefrom, and update the hardware mapping scheme to reflect results of the query.

Generally, embodiments of the present invention relate to protecting secure data within streaming media by storing the secure data to a protected memory segment. As used herein, the phrase "protected memory segment," or protected source segment/protected target segment, is not meant to be limiting and may encompass any region of memory that may be protected by hardware-based rules. For instance, the memory region may be on a central processing unit (CPU), i.e., system memory; on a graphics processing unit (GPU), i.e., video memory; on other discrete hardware; or any combination thereof. Further, as discussed more fully below, the memory region may be dynamically allocated and updated based on various criteria. Examples of these criteria include, but are not limited to, the following: the number of media streams being processed; the rate of flow of each of the streams; the number of presentation devices rendering content from the media streams; the collateral load on the system and/or video memory; and a standard of output protection applied to the media streams. As such, the protected memory segment may be expanded, reduced, moved from one memory region to another, and/or shared by distinct memory regions.

Further, the hardware-based rules are established to protect the secure data of a media stream when written to the protected memory segment, protected source segment, and protected target segment. Because hardware protections are much more secure than software protections, the hardware-based rules provide a robust shielded environment to block against internal and external attacks. In addition, by implementing hardware techniques for strongly guarding the secure data, the secure data is not exposed to the operating system or nontrusted components, and no loopholes are available for hackers to gain meaningful access to the secure data. That is, a hacker cannot defeat the protective approach offered by the hardware-based rules upon reverse engineering, patching, altering software or data accessible by the CPU; thus, the integrity of the secure data is maintained. Generally, the hardware-based rules ensure the secure data cannot be inappropriately copied to unprotected memory, is appropriately encrypted upon eviction from the protected memory segment, and is correctly routed to an appropriate output.

Various methods for ensuring the correct copying, encryption, and routing are contemplated by the present invention. In one embodiment, ensuring includes the GPU corrupting exposed content, within the secure data, illicitly accessed at the protected memory segments, to provide a null presentation (e.g., black screen) when rendered by a presentation device. In another instance, a "0" value is returned to any host not authorized to request the secure data. Although two different approaches of ensuring the integrity of the protected memory segment have been described, it should be understood and appreciated by those of ordinary skill in the art that other suitable approaches could be used, and that the invention is not limited to the application of the hardware-based rules shown and described.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
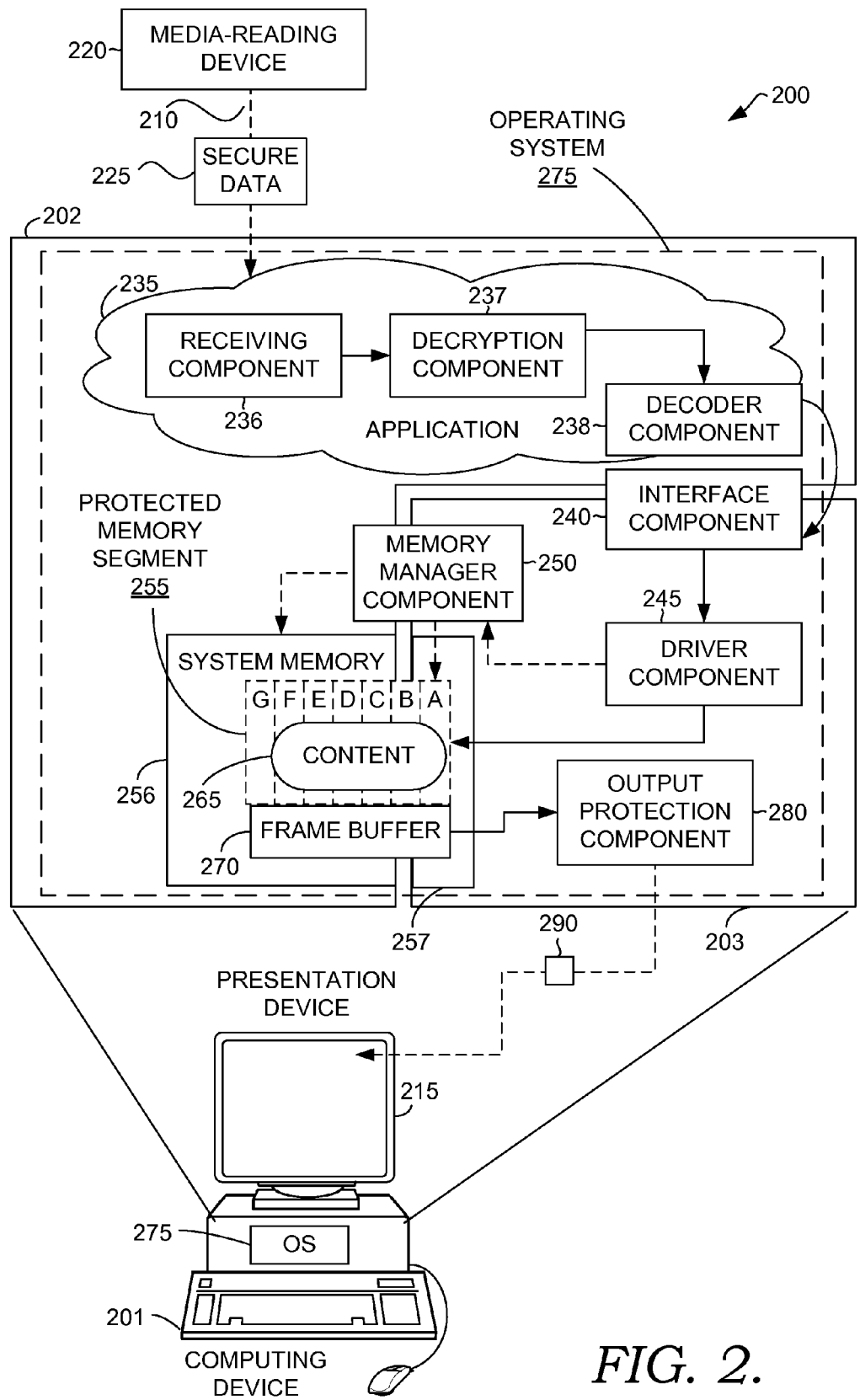
FIG. 2 is a schematic diagram of an exemplary system architecture suitable for use in implementing single-stream media embodiments of the present invention, in accordance with an embodiment of the present invention.

Turning now to FIG. 2, a schematic diagram of an exemplary system architecture 200 suitable for use in implementing single-stream media embodiments of the present invention is shown, in accordance with an embodiment of the present invention. In particular, the system architecture 200 includes a computing device 201 that is generally configured to perform, at least, the following procedures: receiving streaming media 210 from a media-reading device 220; identifying a rate of flow of the streaming media 210 and that secure data 225 is included therein; instantiating a protected memory segment 255 for receiving the secure data 225, where the protected memory segment 255 conditionally limits access to content 265 of the secure data 225 residing therein. In embodiments, the computing device 201 is further configured for dynamically allocating regions of memory 256, 257 to hold the protected memory segment 255 based on the rate of flow, where the memory comprises video memory 257 and system memory 256; writing the secure data 225 to the protected memory segment 255 and securing it as content 265; and releasing the secure data 225 from the protected memory segment 255 for conveyance to one or more presentation devices 215.

It will be understood and appreciated by those of ordinary skill in the art that the system architecture 200 shown in FIG. 2 is merely an example of one suitable computing system environment and is not intended to suggest any limitation as to the scope of use or functionality of embodiments of the present invention. Neither should the system architecture 200 be interpreted as having any dependency or requirement related to any single component or combination of components illustrated therein. Further, the system 200 may be provided as a stand-alone system, as part of a network architecture, or any combination thereof.

Exemplary system architecture 200 includes a computing device 201 for providing hardware (e.g., CPU 202 and GPU 203) for dynamically allocating a protected memory segment 255 to secure the content 265, among other functions. Typically, an operating system 275 is installed on the hardware and supports many of the procedures described below. The computing device 201 may take the form of various types of computing devices. By way of example only, the computing device 201 may be a personal computing device (e.g., computing device 100 of FIG. 1), handheld device (e.g., personal digital assistant), consumer electronic device, various servers, cable box, media-receiving device, and the like. Additionally, the computing device may comprise two or more electronic devices configured to share information therebetween.

In embodiments, the computing device 201 includes a presentation device 215, that is configured to render and/or present the content 265 thereon. The presentation device 215, which is operably coupled to an output of the computing device 201, may be configured as any presentation component that is capable of presenting information to a user, such as a digital monitor, electronic display panel, touch-screen, analog set top box, plasma screen, and the like. In one exemplary embodiment, the presentation device 215 is configured to present video content. In another exemplary embodiment, the presentation device 215 is capable of rendering other forms of media (e.g., audio signals) carried within the secure data 225. In addition, as more fully discussed below, the presentation device 215 is configured to decipher the content 265 upon being scanned out of a frame buffer 270 in an encrypted format.

The operating system (OS) 275 refers generally to the software that manages the sharing of the resources of the computing device 201 and provides programmers with an interface used to access those resources. In operation, the operating system 275 interprets system data and detects available memory regions within the system memory 256 and the video memory 257 to assist instantiation of the protected memory segment 255. As such, the operating system allows for cooperation between the CPU 202 and the GPU 203 when processing the streaming media 210.

In an exemplary embodiment, the operating system 275 facilitates the operation of an application 235, an interface component 240, a driver component 245, a memory manager component 250, and an output protection component 280. In addition, the application 235 may include a receiving component 236, a decryption component 237, and a decoder component 238. This operating-system structure of the operating system 275 is but one example of a suitable structure that may be run on the computing device 201 and is not intended to suggest any limitation as to the scope of use or functionality of the invention. Neither should the illustrated operating system 275 be interpreted as having any dependency or requirement relating to any one or combination of the components 235, 236, 237, 238, 240, 245, 250, and 280 as illustrated. In some embodiments, one or more of the components 235, 236, 237, 238, 240, 245, 250, or 280 may be implemented as stand-alone applications. In other embodiments, one or more of the components 235, 236, 237, 238, 240, 245, 250, and 280 may be integrated directly into the presentation device 215 or the media-reading device 220. By way of example only, a portion of the application 235 may reside on the media-reading device 220, thereby assisting with capturing the streaming media 210. It will be understood by those of ordinary skill in the art that the components 235, 236, 237, 238, 240, 245, 250, and 280 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the computing device 201, thereby functioning in conjunction to present the content 265).

In embodiments, the media-reading device 220 is configured to extract content as the streaming media 210 from computer-readable media or storage mechanism. By way of example only, the media-reading device 220 is a digital versatile disc (DVD) player operably coupled with the computing device 201, or a high-definition (HD) DVD drive integral to the computing device 201, that extracts digital video content from a DVD. In another embodiment, the media-reading device 220 is an AV receiver or HD tuner that receives broadcast media from a remote originating source. Although two different configurations of the media-reading device 220 have been described, it should be understood and appreciated by those of ordinary skill in the art that other types of suitable devices that provide the streaming media 210 may be used, and that embodiments of the present invention are not limited to those media-reading devices 220 described herein.

In operation, the media-reading device 220 provides the streaming media 210 at a rate of flow. Although the rate of flow may vary over time, it is one determinant of whether to expand or reduce the memory region on the CPU 202/GPU 203 allocated for the protected memory segment. Typically, the streaming media 210 includes secure data 225 that has content therein. In one instance, the streaming media 210 is licensed such that a mode of encryption is applied to the secure data 225 consistent with the license. In another instance, the media-reading device 220 encrypts the secure data 225 based on heuristics programmed therein.

In embodiments, application 235 performs a variety of functions that process the streaming media 210. In one instance, the application 235 includes a receiving component 236 that satisfies license requirements and acquires or is provisioned with a session key. Further, the receiving component 236 may determine whether there is secure data 225 being carried within the streaming media 210, thereby influencing a decision of whether to allocate memory for the protected memory segment 255. Accordingly, by identifying the secure data 225 in the streaming media 210, the application 235 is able to recognize upfront and track which media streams require protection so they can be appropriately placed in the proper protected memory segment. Still further, the receiving component 236 may detect the rate of flow of the streaming media 210. In another instance, the application 235 includes a decryption component 237 for deciphering the secure data 225 when conveyed in a decrypted format. In an exemplary embodiment, the decryption component 237 invokes the session key to unlock the encrypted secure data 225, wherein each session key is devoted to a particular media stream. In other embodiments, the decryption component 237 parses, compresses, and performs other operations on the streaming media 210.

In still other instances, the application 235 includes the decoder component 238 that manages routing of the media stream 210, or multiple streams of media, to a respective protected memory segment. Generally, managing involves assigning a unique session identifier to each stream of media and associating that stream of media, along with secured data therein, to a particular protected memory segment. By way of example, the streaming media 210 is assigned a session identifier that associates the secure data 225 with the protected memory segment 255. Thus, the decoder component 238 ensures that multiple media streams are not simultaneously sent to a common protected memory segment.

In other embodiments, the streaming media 210 is encrypted by the decryption component 237 prior to transmission to the decoder component 238. In these embodiments, the decoder component 238 decodes the encrypted secure data 225 (e.g., utilizing the session key assigned to the streaming media 210) and decompresses the secure data 225 precedent to writing the content 265 extracted therefrom to the protected memory segment 255.

In embodiments, the interface component 240 provides a link between the application 235, running on the CPU 202 and a portion of the operating system 275 running on the GPU 203. As such, calls conveying information about the streaming media 210 and the decompressed, unencrypted, secure data 225 are handed to the GPU 203 for processing. Generally, the GPU is a mechanism (e.g., video card, internal circuit board, and other chip sets) that functions as hardware infrastructure on which the operating system 275 supports a variety of components.

One of these components is the driver component 245 which specifies a type of memory to which each media stream is written. If the media stream, as indicated by the application 235, includes secure data that should be protected, the driver component 245 directs the media stream to an associated protected memory segment. Otherwise, the media stream is not written to a secure data store. By way of example, if the application 235 indicates that the media-reading device 220 is communicating the streaming media 210 with the secure data 225 carried therein, the driver component 245 will likely direct the streaming media 210 to the protected memory segment 255 such that the content 265 of the streaming media is written thereto. Once stored, this content 265 cannot be hacked by attackers, read by unauthorized systems, or compromised by any other methods. In an exemplary embodiment, the content 265 should be encrypted such that only data in the clear (e.g., de-encrypted by an appropriate mechanism) is accessible by the application 235 or the protected memory segment 255.

In addition, the driver component 245 of the GPU 203 can intercommunicate with the memory manager component 250 to indicate which media streams should be protected, and hence can strongly correlate a media stream with a protected memory segment. Further, the driver component 245 may provide this information to the output protection component 280, and hence can strongly correlate a media stream with an output to a particular presentation device.

In embodiments, the memory manager component 250 is configured to dynamically allocate a region of memory for one or more protected memory segments. As depicted in FIG. 2, the protected memory segment 255 may reside in the system memory 256 on the CPU 202, on the video memory 257 (e.g., dedicated frame buffer) on the GPU 203, or a combination thereof. Dynamic allocation, as opposed to static allocation of memory, generally refers to an approach for identifying available hardware memory and expanding and contracting the size of the protected memory segment 255 based on various criteria (e.g., rate of flow of the streaming media as determined by the application 235). Because, the protected memory segment 255 is dynamic in nature and tailored in size to the requirements of the streaming media 210, the protected memory segment 255 does not unduly limit the amount of memory available for storing the content 265, nor does it penalize the operating system 275 when protection of the content 265 is not required. That is, the memory manger component 250 adds, subtracts, and generally controls the allocations of hardware memory based on a volume of the content 265 within the secure data 225. Thus, the protected memory segment 255 may grow (e.g., from A incrementally to G) or shrink (e.g., from G incrementally to A) without unduly penalizing other memory allocations accessed by the operating system 275.

In addition, upon detecting a new media stream with secure content therein, the memory manager component 250 may be triggered to instantiate a new protected memory segment dedicated to receiving content from the new media stream. Further, a protected memory segment may be torn down upon the memory manager component 250 determining that the media stream associated therewith is no longer active.

In an exemplary embodiment, the memory manager component 250 sets the hardware-based rules that ensure the protection of the content 265 stored in the protected memory segment 255. As discussed above, these hardware-based rules, when enforced, deny unauthorized access to the content 265. In an exemplary embodiment, denying unauthorized access includes producing a null presentation when an attempt to render the content 265 at the presentation device 215 is encountered. Several situations that trigger enforcement of the hardware-based rules are the following: receiving an indication of an attempt to read from the protected memory segment 255 by an unauthorized source; recognizing the content 265 is not being encrypted during the release for conveyance to the presentation device 215; receiving an indication that the content 265 is being illicitly copied for storage at a region of memory that is not the protected memory segment 255; receiving an indication the allocation for the protected memory segment 255 is lowered thereby exposing a section of the content 265; and receiving an indication that the operating system 275 cannot differentiate between encode and decode operations. Although five situations for enforcing the hardware-based rules are described above, embodiments of the present invention contemplate applying the hardware-based rules in various other situations that compromise the security of the content 265.

The frame buffer 270 is generally configured to receive the content 265 when pushed from the protected memory segment 255 associated therewith. Also, the frame buffer 270 may be configured to expose the content 265 to the output protection component 280 so that it is visible to the presentation device 215. In an exemplary embodiment, the frame buffer 270 scans out the content 265 at a frequency consistent with the rate of flow of the streaming media 210 and protects the content 265 during scanning by enforcing the hardware-based rules.

The output protection component 280 scans out the content 265 for rendering at one or more presentation devices that are approved for receiving the content 265. Accordingly, the output protection component 280 identifies the outputs of the computing device 201 are operably coupled to the approved presentation devices and routes the content 265 thereto. In embodiments, the status of the approved presentation device is achieved by matching the rendering capabilities of each presentation device selected for display with a type of media stream being provided by the media-reading device 220. By way of example, if the presentation device 215 is an analog television and the streaming media 210 is an analog signal, then the presentation device 215 is provisioned as approved.

Further, the output protection component 280 is configured to perform one or more of the following operations: manipulate the presentation of the content 265 (e.g., provide brightness control), provide compositioning capabilities (e.g., draw script that interacts with movies), provide filtering, or apply encryption. In embodiments, applying encryption includes, but is not limited to, identifying at least one output from which the content 265 is being evicted, determining a type of the presentation device 215 operably connected to the output, and applying encryption to the content 265 based on the type of the presentation device 215. By way of example, if the presentation device 215 is a liquid crystal display (LCD) monitor that supports high-definition multimedia interface (HDMI) protection, the output protection component 280 may apply encryption consistent with the HDMI digital-rights management scheme. Accordingly, by applying encryption to the content 265 precedent to the eviction from the computing device 201, the content 265 is guarded against midstream media-capturing techniques.

Figure 3:
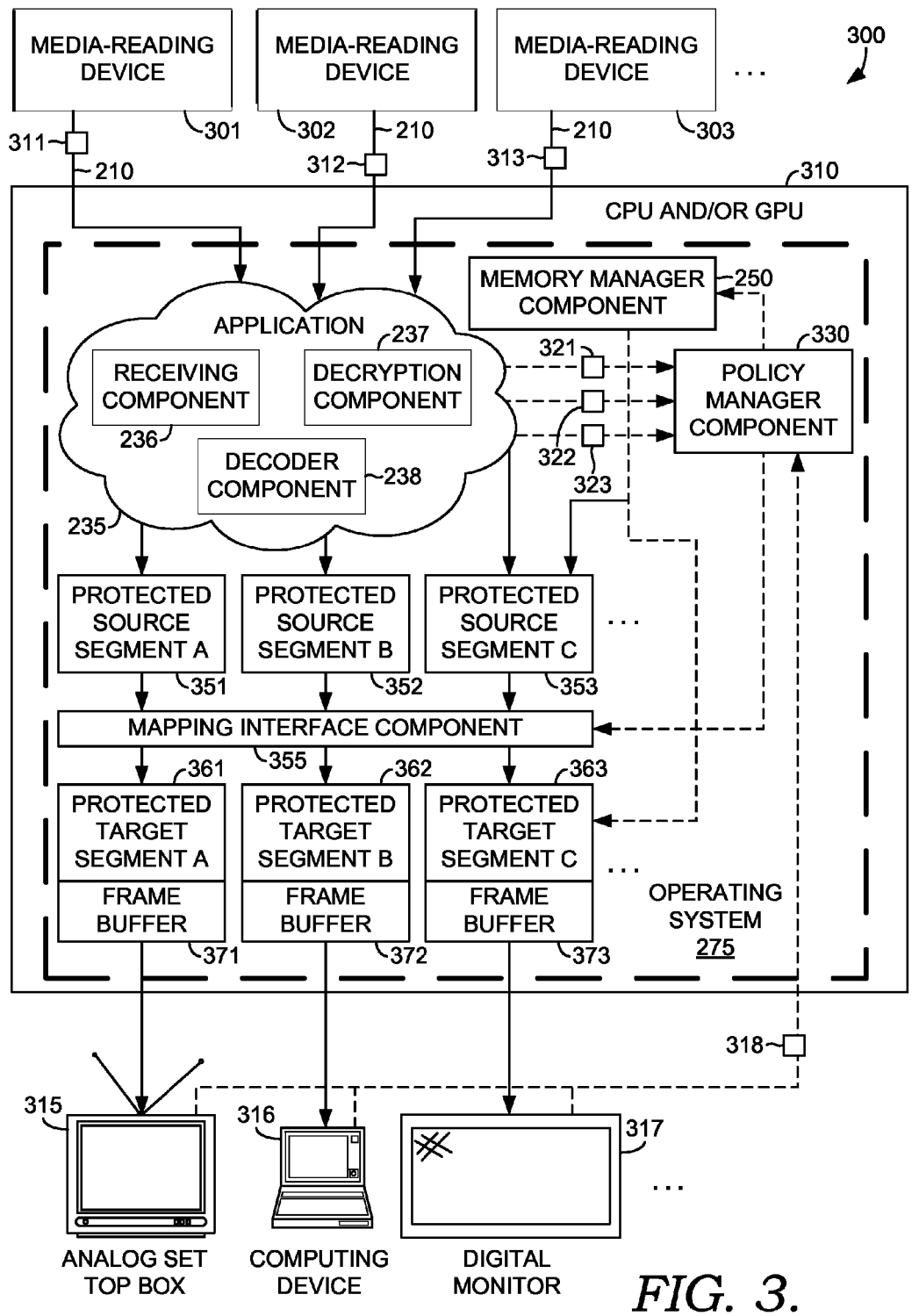
FIG. 3 is a schematic diagram of an exemplary system architecture suitable for use in implementing multiple media stream embodiments of the present invention, in accordance with an embodiment of the present invention.

Turning now to FIG. 3, a schematic diagram of an exemplary system architecture 300 suitable for use in implementing multi-stream media embodiments of the present invention is shown, in accordance with an embodiment of the present invention. In particular, the system architecture 300 includes a GPU/CPU 310 that is generally configured to perform, at least, the following procedures: recognizing the streaming media 210 being communicated from media-reading devices 301, 302, and 303; identifying secure data 311, 312, and 313 within the streaming media 210; detecting modes of encryption 321, 322, and 323 applied to the streaming media 210; dynamically allocating protected source segments 351, 352, and 353 within the system memory or the video memory for, at least temporarily, writing the secure data 311, 312, and 313 therein; and associating the protected source segments 351, 352, and 353 with each of the streaming media 210 based on the detected modes of encryption 321, 322, and 323.

In further embodiments, the system architecture 300 is generally configured to perform, at least, the following procedures: identifying standards of output protection 318 that are supported by presentation devices 315, 316, and 317 selected for receiving the streaming media 210; dynamically allocating protected target segments 361, 362, and 363 within system memory or video memory for, at least temporarily, writing the secure data 311, 312, and 313 pushed from the protected source segments 351, 352, and 353 thereto; associating each of the protected target segments 361, 362, and 363 with each of the presentation devices 315, 316, and 317, based on the standard of output protection 318 that is applied by the protected target segments 361, 362, and 363; and evicting the streaming media 210 to the presentation devices 315, 316, and 317 such that the secure data 311, 312, and 313 is rendered thereby.

In still further embodiments, the system architecture 300 is generally configured to map the associated protected source segments 361, 362, and 363 to the associated protected target segment 351, 352, and 353, respectively, according to whether the modes of encryption 321, 322, and 323 correspond with the standard of the output protection 318 supported by each of the presentation devices 315, 316, and 317. Typically, the GPU or the CPU may perform any one of the procedures above, or perform one or more in conjunction with each other.

It will be understood and appreciated by those of ordinary skill in the art that the system architecture 300 shown in FIG. 3 is merely an example of one suitable computing system environment and is not intended to suggest any limitation as to the scope of use or functionality of embodiments of the present invention. Neither should the system architecture 300 be interpreted as having any dependency or requirement related to any single component or combination of components illustrated therein. Further, the system 300 may be provided as a stand-alone system, as part of a network architecture, or any combination thereof.

Exemplary system architecture 300 includes an infrastructure comprising a CPU and/or GPU 310 for providing a hardware foundation upon which memory is dynamically allocated for holding the protected memory segments 351, 352, and 353, and the protected target segments 361, 362, and 363 to protect the secure data 311, 312, and 313, or content therein. Typically, the operating system 275 is installed on the hardware infrastructure, as more fully described above with reference to FIG. 2.

In embodiments, the system architecture 300 includes the presentation devices 315, 316, and 317, that are each configured to render and/or present one of the secured data 311, 312, and 313 thereon. These presentation devices 315, 316, and 317 may be any of the devices disclosed above with reference to the presentation device 215 of FIG. 2. In the embodiment depicted in FIG. 3, the presentation device 315 is an analog set top box that supports Macrovision® protection of content, the presentation device 316 is a computing device that supports high-definition digital support protection (HDCP), and the presentation device 317 is a digital monitor that does not support HDCP. These characteristics of the presentation devices 315, 316, and 317 are reflected in the standards of output protection 318 provided by each of the presentation devices 315, 316, and 317.

Additionally, the system architecture 300 includes the media-reading devices 301, 302, and 303. These may be configured as any of the embodiments of the media-reading device 220 of FIG. 2, as discussed more fully above. As such, no further discussion of the features of the media-reading devices 301, 302, and 303 will be included.

In an exemplary embodiment, the operating system 275 facilitates the operation of the application 235, the memory manager component 250, a policy manager component 330, and a mapping interface component 355. Other components, such as the interface component 240, the driver component 245, the memory manager component 250, and the output protection component 280, although not shown, are contemplated as providing functionality to the operating system 275, as discussed above with reference to FIG. 2. In addition, the application 235 may include the receiving component 236, the decryption component 237, and the decoder component 238. These components 236, 237, and 238 of the application 235 provide similar functionality as to that discussed above with reference to FIG. 2. Accordingly, the components 236, 237, and 238 will not be further discussed.

This operating-system structure of the operating system 275 is but one example of a suitable structure that may be run on the CPU and/or GPU 310, and is not intended to suggest any limitation as to the scope of use or functionality of the invention. Neither should the illustrated operating system 275 be interpreted as having any dependency or requirement relating to any one or combination of the components 235, 250, 330, or 355 may be implemented as stand-alone applications. In other embodiments, one or more of the components 235, 250, 330, and 355 may be integrated directly into one of the presentation devices 315, 316, or 317 or the media-reading devices 301, 302, or 303. By way of example only, a portion of the application 235 may reside on the media-reading device 301, thereby assisting with capturing the streaming media 210. It will be understood by those of ordinary skill in the art that the components 235, 250, 330, and 355 illustrated in FIG. 3 are exemplary in nature and in number and should not be construed as limiting.

Accordingly, any number of components may be employed to achieve the desired functionality within the scope of embodiments of the present invention. Although the various components of FIG. 3 are shown with lines for the sake of clarity, in reality, delineating various components is not so clear, and metaphorically, the lines would more accurately be grey or fuzzy. Further, although some components of FIG. 3 are depicted as single blocks, the depictions are exemplary in nature and in number and are not to be construed as limiting (e.g., although only three presentation devices 315, 316, and 317 are shown, many more may be communicatively coupled to the CPU and/or GPU 310, thereby functioning in conjunction to present content).

Initially, the application 235, as discussed above, is configured to receive the streaming media 210 from media-reading devices 301, 302, and 303, and to the identify whether the secure data 311, 312, and 313 (e.g., premium audio/video content) is present within the streaming media 210. The memory manager component 250, as discussed above, is configured for managing the dynamic allocation of hardware memory (i.e., growing and shrinking the various protected source segments and protected target segments as needed). But, in the embodiment shown in FIG. 3, the memory manager component 250 is also provisioned to instantiate a plurality of protected source segments and a plurality of protected target segments. Typically, provisioning is performed in accordance with which media-reading devices 301, 302, and 303 are presently streaming media and which presentation devices 315, 316, and 317 are presently scanning secure data. Also, in embodiments of the system architecture 300 of FIG. 3, the memory manager component 250 is adapted to dynamically manipulate the hardware memory allocated for a plurality of protected source segments and a plurality of protected target segments within system memory or video memory. That is, each of the protected source segments 351, 352, and 353 adjust their capacity in accordance with a rate of flow of the streaming media 210 directed thereto from one of the media-reading devices 301, 302, or 303. In this way, the streaming secure data 311, 312, or 313 will not overwhelm any one of the protected source segments 351, 352, or 353, or any one of the protected target segments 361, 362, or 363.

In an exemplary embodiment, the memory manger component 250 sets the hardware-based rules that ensure the protection of the secure data 311, 312, or 313 stored in the protected source segments 351, 352, and 353, and the protected target segments 361, 362, and 363. As discussed above, these hardware-based rules, when enforced, conditionally limit access to the secure data 311, 312, or 313 by altering its format to produce a null presentation when rendered at any of the presentation devices 315, 316, and 317. Several situations that trigger enforcement of the hardware-based rules are the following: detecting an attempt to copy secure data of the streaming media 210 to a location other than an identified protected source segment of the group of protected source segments allocated for holding the secure data; detecting an unauthorized attempt to copy secure data from a protected source segment to a location other than a correlating protected target segment as indicated by the hardware mapping scheme; and detecting an unauthorized attempt to copy secure data from an identified protected target segment allocated for conveying the secure data to an associated presentation device. Further, the hardware-based rules require that upon decryption utilizing a session key, as discussed above, the decoded secure data may be written to one of the protected source segments 351, 352, or 353. But, the hardware-based rules allow freely copying nonprotected data to any one of the protected source segments 351, 352, or 353, or the protected target segments 361, 362, or 363. Although five situations for enforcing the hardware-based rules are described above, embodiments of the present invention contemplate applying the hardware-based rules in various other situations that compromise the security of the secure data 311, 312, or 313.

In an embodiment, the policy manager component 330 is configured to manage the streaming media 210 from each of the protected source segments 351, 352, and 353 to each of the protected target segments 361, 362, and 363. In general, managing includes detecting the modes of encryption 321, 322, and 323 applied to the streaming media 210, and associating the protected source segments 351, 352, and 353 with the streaming media 210 from each of the media-reading devices 301, 302, and 303 based on the detected modes of encryption 321, 322, and 323. Typically, the modes of encryption 321, 322, and 323 are applied according to a license associated with a particular media stream. These licenses, or protection guidelines, may be provided to the policy manager component 330 directly or derived from the type of content identified within each of the media streams. Accordingly, by distilling the licensing attached to each media stream, the policy manager component 330 can differentiate between multiple video streams from the moment they are decrypted by the application 235 until the moment they are presented at one or more of the presentation devices 315, 316, and 317.

In other embodiments, managing includes identifying the standards of output protection 318 that are supported by each of the presentation devices 315, 316, and 317 and associating each of the protected target segments 361, 362, and 363 with one or more presentation devices 315, 316, and 317 based on standards of output protection 318 that are supported by each. In a particular example, identifying the standards of output protection 318 that are supported by each of the presentation devices 315, 316, and 317 includes recognizing types of the presentation devices 315, 316, and 317, and enumerating capabilities or limitations of the presentation devices 315, 316, and 317 based on the recognized types. By way of example, the protected target segment A 361, may be paired with the presentation device 316, which is a computing device that supports HDCP, as indicated above. Further, the policy manager component 330 may be configured to query the protected target segments 361, 362, and 363 to verify which of the presentation devices 315, 316, and 317 are evicting secure data therefrom. If different presentation devices are present and are attempting to evict secure data (e.g., as selected by a user), the policy manager component 330 may update the associations between the protected target segments 361, 362, and 363 and the presentation devices 315, 316, and 317.

In embodiments, the mapping interface component 355 is configured to interrogate the policy manager component 330 to collect the associations between the media-reading devices 301, 302, and 303, and the protected source segments 351, 352, and 353, as well as the associations between the protected target segments 361, 362, and 363 and the presentation devices 315, 316, and 317. Based on the associations and the terms/conditions of the licenses, the mapping interface component 355 may develop a hardware mapping scheme. Accordingly, each of the protected source segments 351, 352, and 353 may be mapped to one or more of the protected target segments 361, 362, and 363 based on the hardware mapping scheme.

Maintaining an accurate mapping is critical as different licenses define which standards of output protection may be applied to which streaming media. For instance, using the example above, the protected target segment A 361 may be paired with the presentation device 316, which is a computing device that supports HDCP. If the mode of encryption or license attached to a media stream flowing to the protected source segment B 352 corresponds to the HDCP standard of output protection, then the protected target segment A 361 may be correlated with the protected source segment B 352 via the hardware mapping scheme. Assuming, arguendo, that the presentation device 315 is an analog set top box that supports an analog-specific protection of content and is associated with the protected target segment B 362. In this instance, because it is illegal to set certain types of analog-specific protection to a stream without it being encompassed by the license, the protected target segment B 362 would not be correlated to the protected source segment B 352 via the hardware mapping scheme. Further, assuming that the presentation device 317 is a digital monitor that does not support HDCP and is associated with the protected target segment C 363. In this instance, because the license indicated that a certain level of security (e.g., HDCP standard of output protection) should be applied to the media stream prior to eviction from the CPU and/or GPU 310, the protected target segment C 363 would not be correlated to the protected source segment B 352 via the hardware mapping scheme. That is, secure data would be disallowed from being pushed from the protected target segment C 363 to the protected source segment B 352.

Generally, correlating via the hardware mapping scheme, or mapping, creates a tightly coupled relationship between a particular protected source segment and a particular protected target segment. The tight coupling ensures that no access is gained to the secure data when it is pushed from the particular protected source segment to the particular protected target segment. In addition, the tight coupling ties the particular protected source segment to the particular protected target segment, thereby guaranteeing that the secure data flows to an appropriate presentation device and is encrypted consistent with the license. Accordingly, the license may be upheld without continuously verifying the standard of output protection being applied to a media stream.

Further, the mapping interface component 355 is configured to periodically query the policy manager component 330 for the associations stored therein to determine whether to update the hardware mapping scheme to reflect results of the query. As such, the hardware mapping scheme may be dynamically modified to reflect current correlations between the protected source segments 351, 352, and 353 and the protected target segments 361, 362, and 363 based on whether the modes of encryption 321, 322, and 323 correspond with the standards of the output protection. By way of example, if the media stream is moved from the presentation device 315 to the presentation device 316, the application 235 notifies the policy manager component 330 to alter the associations, and these altered associations are collected by the mapping interface component 355. Next, the mapping interface component 355 updates the hardware mapping scheme and adjusts mapping from the protected target segment 361 to the protected target segment 362. But, if the license attached to the media stream is not compatible with the standard of output protection associated with the protected target segment 362, then no update to the hardware mapping scheme will be invoked and no remapping will occur.

As discussed above, with reference to the frame buffer 270 of FIG. 2, the frame buffers 371, 372, and 373 are configured to scan out the secure data 311, 312, and 313 to outputs. Also, embodiments of the system architecture 300 of FIG. 3 contemplate utilizing the output protection component 280 of FIG. 2 for encrypting the streaming media 210 according to the standard of output protection 318 associated with the protected target segments 361, 362, and 363. This standard of output protection 318 should be encompassed within the scope of protection policies of the license attached to the respective media streams being evicted, as guaranteed by the hardware mapping scheme.

As discussed above with reference to the protected memory segment 255 of FIG. 2, the secure data 311, 312, or 313 may be similarly written to, and protected by, the protected source segments 351, 352, and 353, and the protected target segments 361, 362, and 363. Additionally, the modes of encryption 321, 322, and 323 of the streaming media 210 is deciphered precedent to entering the protected source segments 351, 352, and 353 such that the stored secure data 311, 312, and 313 is decrypted information.

Figure 4:
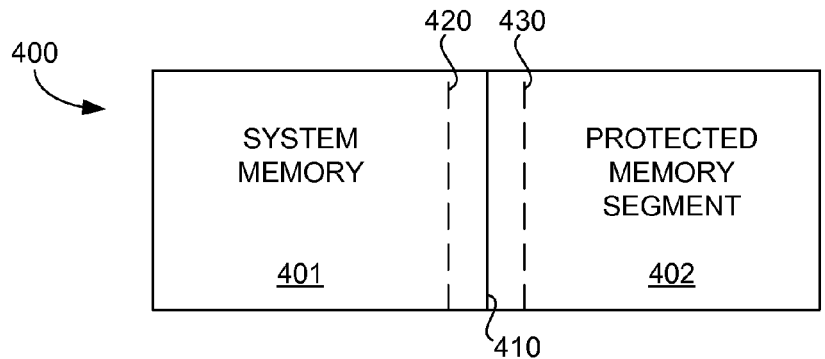
FIG. 4 is a diagrammatic memory region for illustrating dynamically allocating a protected memory segment for protecting secure data, in accordance with an embodiment of the present invention.

Turning to FIG. 4, a diagrammatic memory region 400 illustrating dynamically allocating a protected memory segment 402 for protecting secure data is shown, in accordance with an embodiment of the present invention. Initially, the protected memory segment 402 is instantiated on hardware memory that is shared with system memory 401 and/or video memory (not shown). The architecture of the memory manager component 250 (see FIGS. 2 and 3) allows for dynamically manipulating an allocation of a region of the hardware memory to hold the protected memory segment 402. In instances, this manipulation is based on the rate of flow of streaming media or a volume of content to write to the protected memory segment 402 at a given time.

Precedent to receiving streaming media with secure content, no region of memory is instantiated to be designated as the protected memory segment 402. Upon receiving an indication of the streaming media (e.g., beginning to play content that requires protection) a boundary 430 is established that creates an envelope of hardware memory to hold the content carried in the streaming media. In an exemplary embodiment, the video memory of the GPU is initially selected as the region of memory that is provided for the protected memory segment 402, as it is well suited for processing the streaming media. However, upon detecting an increase in the rate of flow of the streaming media, the region of memory that is allocated for the protected memory segment 402 may be dynamically expanded to include the system memory 401.

Concurrently, this protected memory segment 402 is not available to other applications and is indicated as such upon virtualizing available memory upon being queried by the other applications. As the streaming media reaches a steady state, the protected memory segment 402 may be expanded to boundary 410, in order to fulfill memory needs. The boundary 420 indicates that the entire available hardware memory is being shared between the protected memory segment 402 and the system memory 401.

If the memory needs of the streaming media increase, or spike, the allocation for the protected memory segment 402 encroaches on the system memory 401 as indicated by boundary 420. Because, the protected memory segment 402 is typically granted a higher priority than the system memory 401, applications consuming the system memory 401 will be adversely affected. But, if other applications have a higher priority than the streaming media and begin consuming more resources than available in the system memory 401, then boundary 430 will be established where the system memory 401 encroaches on the protected memory segment 402. By preemptively reducing the protected memory segment 402, previously protected content may now be exposed to the operating system. In response, the hardware-based rules recognize the artificial shrinking of the protected memory segment 402 and alter the exposed content, which is no longer protected, to display as a null presentation when rendered at a presentation device.

Figure 5:
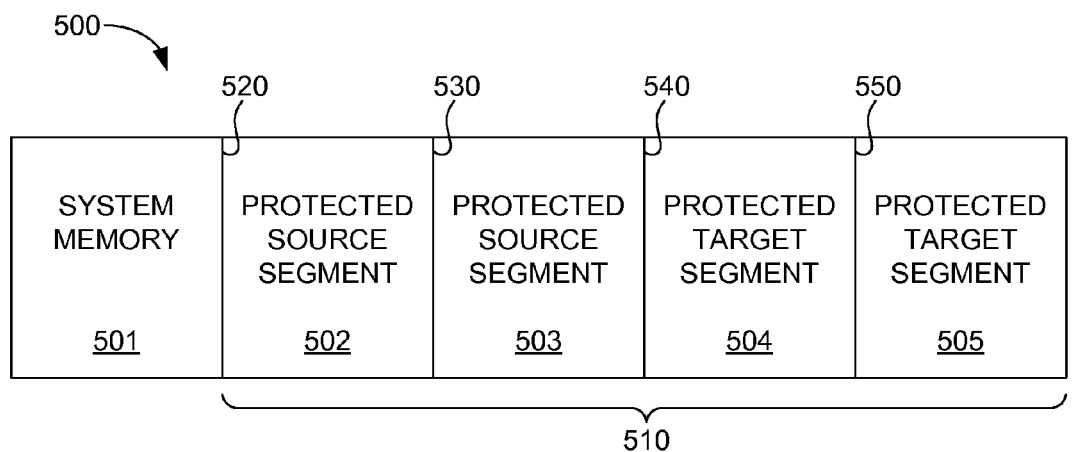
FIG. 5 is a diagrammatic memory region for illustrating dynamically allocating protected source segments and protected target segments for protecting secure data, in accordance with an embodiment of the present invention.

With reference to FIG. 5, a diagrammatic memory region 500 that illustrates dynamically allocating protected source segments 502, 503 and protected target segments 504, 505 for protecting secure data is shown, in accordance with an embodiment of the present invention. As discussed above, the hardware memory allocated for the protected source segments 502, 503 and the protected target segments 504, 505 may require less memory or more memory than is available, as governed by the properties of the streaming media. In the example configuration depicted in FIG. 5, the available hardware memory is being completely utilized by protected memory 510 (i.e., the protected source segments 502, 503, the protected target segments 504, 505), and applications on the system memory 501.

Assuming, arguendo, that a first and second media stream are being received by the system and assigned to the protected source segments 502, 503, respectively. In this instance, boundaries 520 and 530 represent dynamic upper limits of the protected source segments 502, 503, respectively, that are adjustable-based memory requirement criteria associated with the first and second media streams. Next, assume that the protected target segments 504, 505 correspond with a first and second presentation device. In this instance, boundaries 540 and 550 represent dynamic upper limits of the protected target segments 504, 505, respectively, that are adjustable-based memory requirement criteria associated with applying a standard of output protection to the first and second presentation devices.

In operation, content from the first media stream may be copied to the protected source segment 502 but not the protected source segment 503. Likewise, content from the second media stream may be copied to the protected source segment 503 but not the protected source segment 502. A mapping interface component could be programmed to allow either of these protected source segments 502 or 503 to write to either of the protected target segments 504 or 505, but any attempt to copy data to a disallowed protected target segment would result in the content being written black. Likewise, any attempt to copy data between the two protected target segments 504 and 505 would result in the content being written black, per the hardware-based rules.

Initially, similar to above, no hardware memory is associated with the protected memory 510 when no media is streaming; however, placeholders for the protected source segments 502, 503, and the protected target segments 504, 505 may be established. But, as the streaming media beings flow and content from the media streams is populated to the protected memory 510, distinct envelopes of hardware memory are grown and designated as the protected memory 510. In some instances, each of the protected memory 510 reaches a steady state during the flow. But, if one or more segments of the protected memory 510 begin growing too rapidly (e.g., to support a large media stream), heuristics may be employed to limit hardware memory allocated for that media stream.

Figure 6:
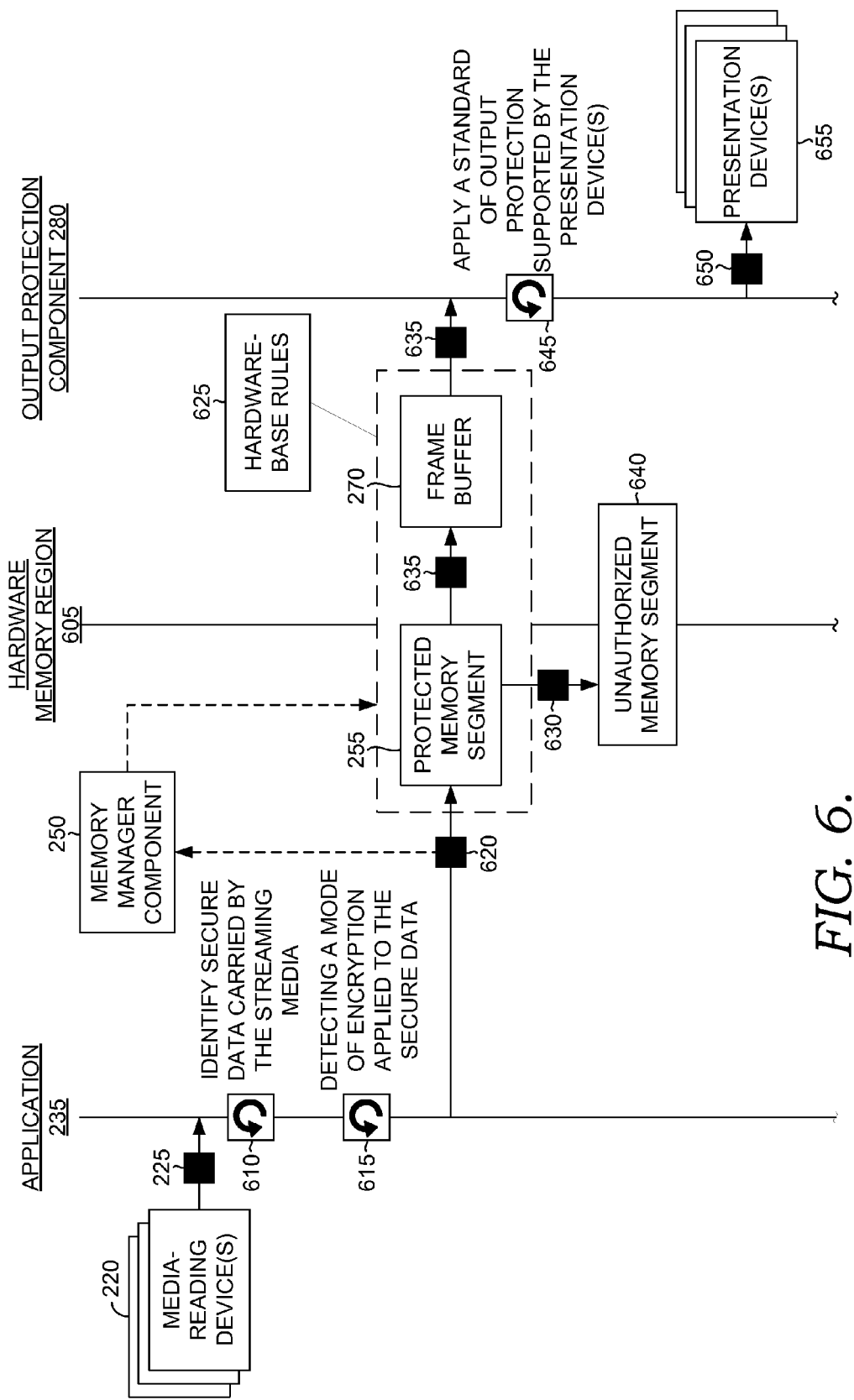
FIG. 6 is a diagrammatic flow chart illustrating protecting the secure data via the hardware-based rules, in accordance with an embodiment of the present invention.

Turning to FIG. 6, a diagrammatic flow chart is shown that illustrates protecting the secure data via the hardware-based rules, in accordance with an embodiment of the present invention. Initially, one or more media-reading devices 220 provide secure data 225 to the application 235, typically running on a CPU. The application 235 may perform procedure 610 that identifies the secure data 225 being carried in the streaming media; thus, indicating that a protected memory segment 255 is to be instantiated. Also, the application 235 may perform a procedure 615 to detect the mode of encryption applied to the secure data 225. Accordingly, the application will recognize which type of license is attached to the streaming media and which presentation device 655 may receive the streaming media based on a comparison of the licenses to the standard of output protection utilized by each of the presentation devices 655. The secure data 225 is then passed in a decoded format 620 to the protected memory segment 255 within a hardware memory region 605. The size of the protected memory region 255 may be dynamically controlled by the memory manger component 250. In one embodiment, dynamic control is based on monitoring the flow of the secure data 225 provided in the streaming media.

The content 635 extracted from the secure data 225 is written to the protected memory segment 255 and passed to the frame buffer 270 to be scanned out to the presentation devices 655. As previously discussed, the content 635 stored in the protected memory segment 255 and the frame buffer 270 is secured by hardware-based rules 625. One instance of enforcing the hardware-based rules 625 involves altering content 630 to display as black upon being copied to, or read by, an unauthorized memory segment 640. Although depicted as the protected memory segment 255, the hardware memory within the hardware memory region 605 may be designated as one or more protected source segments, one or more protected target segments, and the content passed therebetween according to the hardware mapping scheme.

The content 635 is then scanned out to the output protection component 280 that performs various operations on the content prior to eviction to the presentation devices 655. One exemplary operation is procedure 645 that applies a standard of protection to the content 635, where the standard of output protection is supported by at least one of the presentation devices 655 to which the content 635 is being routed. In an embodiment, the standard of output protection applied to the content 635 is encompassed by the scope of the license attached to the streaming media, as determined by the application 235. Next, the content 635 is evicted in an encrypted format 650 to the presentation devices 655.

Figure 7:
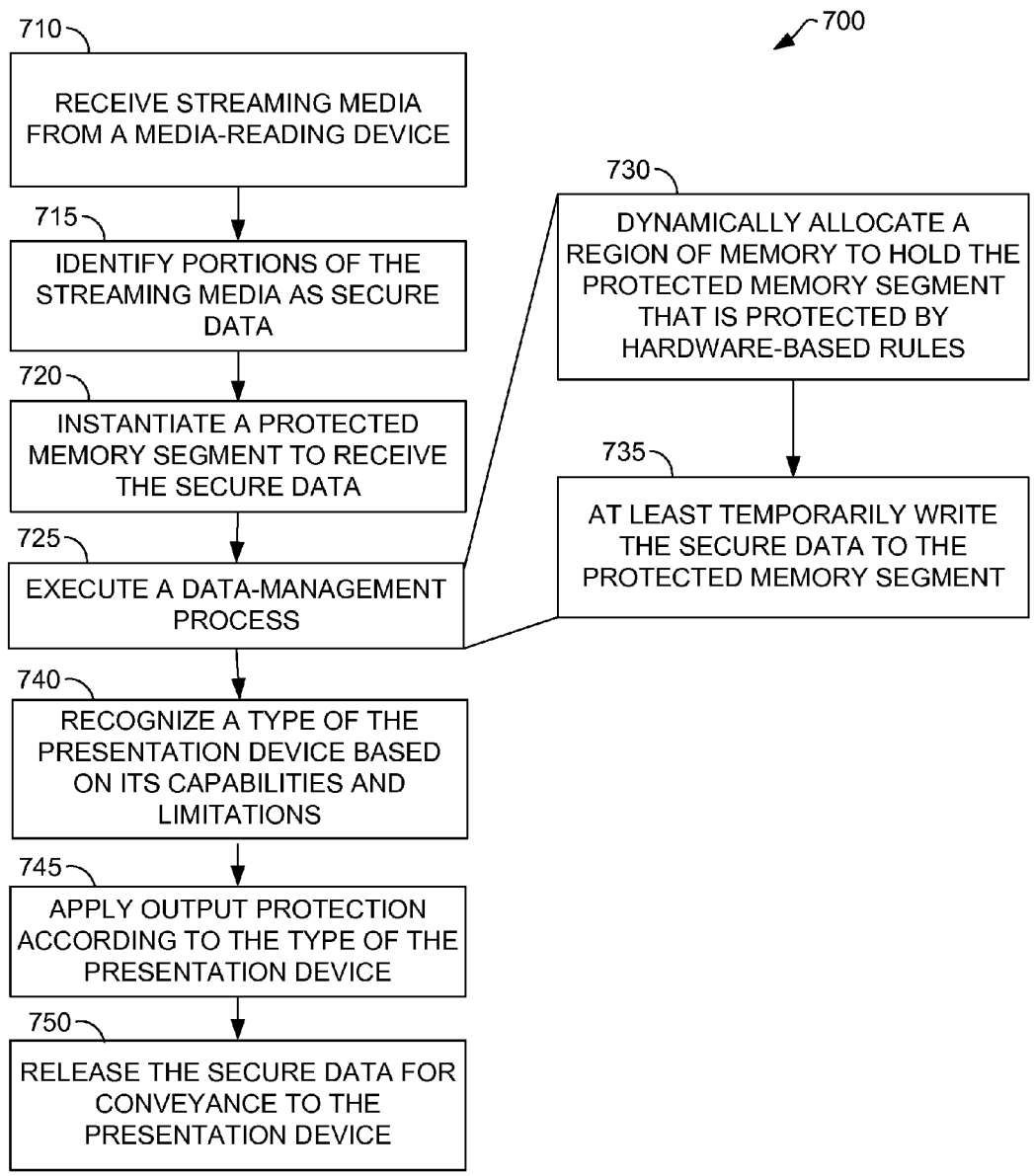
FIG. 7 is a flow diagram illustrating an overall method for protecting secure data by writing content of the secure data to a protected memory segment, in accordance with an embodiment of the present invention.

Turning now to FIG. 7, a flow diagram is illustrated that shows an overall method 700 for protecting secure data by writing content of the secure data to a protected memory segment, in accordance with an embodiment of the present invention. Initially, streaming media is received from a media-reading device, as indicated at block 710. As indicated at block 715, portions of the streaming media are identified as secure data. Upon identifying the secure data, a protected memory segment may be instantiated to receive the secure data, as indicated at block 720. As indicated at block 725, a data-management process may be executed. In an exemplary embodiment, execution includes, in part, the following procedures: dynamically allocating a region of memory to designate as the protected memory segment (see block 730) and at least temporarily writing the secure data to the protected memory segment (see block 735). Typically, the protected memory segment is protected by hardware-based rules.

As indicated at block 740, a type of presentation device is recognized based on its capabilities and limitations. Output protection may then be applied to the secure data according to the type of the presentation device, as indicated at block 745. As indicated at block 750, the secure data, as encrypted with the standard of output protection, may be released for conveyance to the presentation device.

Figure 8:
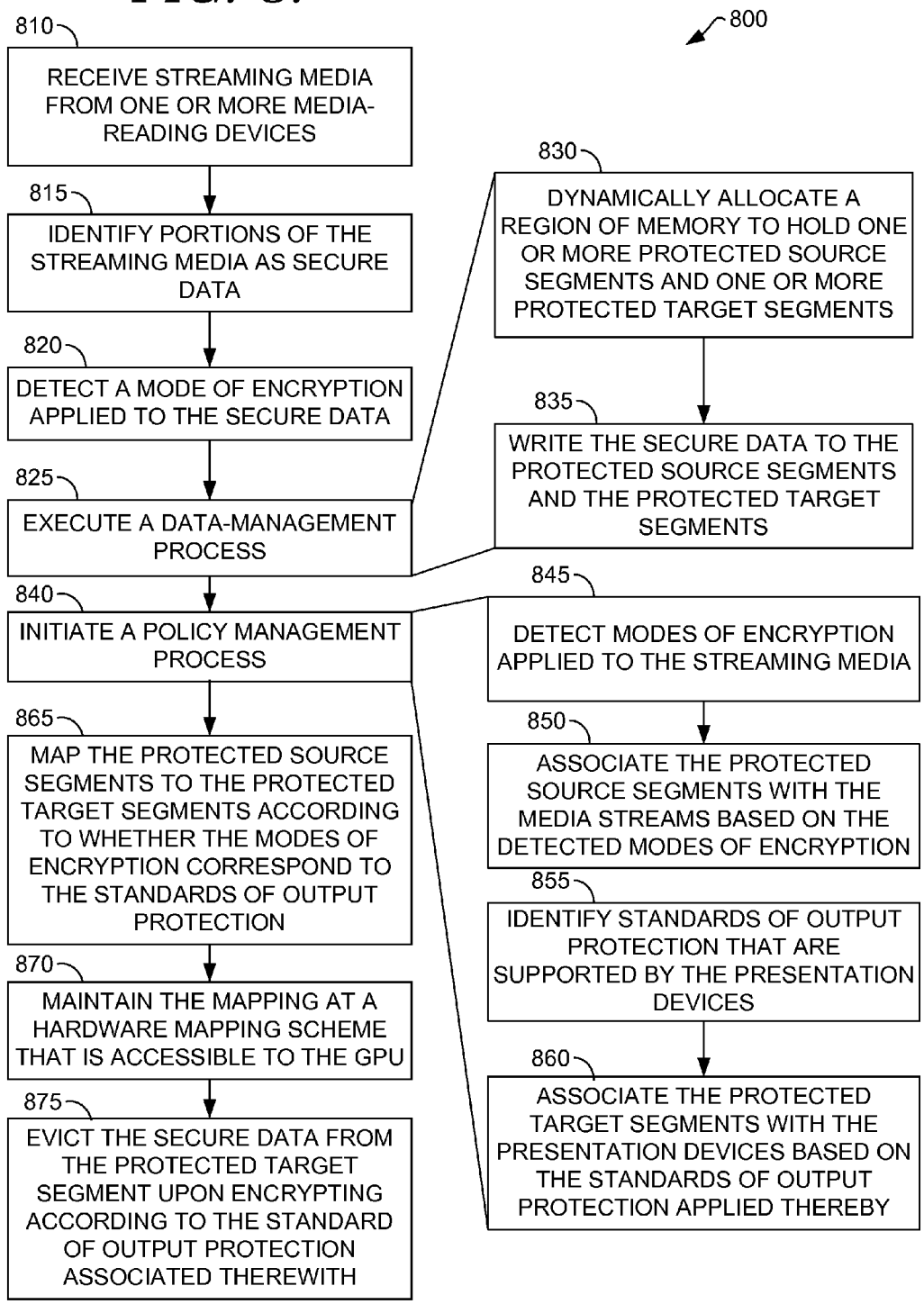
FIG. 8 is a flow diagram illustrating an overall method for providing hardware-based protection of multiple video streams, in accordance with an embodiment of the present invention.

With reference to FIG. 8, a flow diagram is illustrated that shows an overall method 800 for providing hardware-based protection of multiple video streams, in accordance with an embodiment of the present invention. Initially, streaming media is received from one or more media-reading devices, as indicated at block 810. Portions of the streaming media are identified as secure data, as indicated at block 815. As indicated at block 820, a mode of encryption applied to the secure data, as governed by a license attached to the streaming media, is detected. As indicated at block 825, a data-management process is executed. In a particular embodiment, execution includes at least the following processes: dynamically allocating a region of memory to hold one or more protected source segments and one or more protected target segments at block 830; writing the secure data to the protected source segment at 835; and pushing the secure data to the appropriate protected target segments (e.g., based on the hardware mapping scheme).

Next, as indicated at block 840, a policy management process is initiated. The policy management process includes, in embodiments, detecting modes of encryption applied to the streaming data (see block 845) and associating the protected source segments with media streams based on the detected modes of encryption (see block 850). In other embodiments, the policy management process includes identifying standards of output protection that are supported by the presentation devices (see block 855) and associating the protected target segments with the presentation devices based on the standards of output protection applied thereby (see block 860).

As indicated at block 865, the protected source segments and the protected target segments may be mapped together according to whether the modes of encryption correspond to, or the license encompasses, the standards of output protection. As indicated at block 870, the mapping is maintained at a hardware mapping scheme, which is dynamically updateable to remain consistent with changes in the streaming media licenses and encryption supported by the presentation devices. As indicated at block 875, the secure data is evicted from the protected target segment upon encrypting the secure data according to the standard of output protection associated with the protected target device.

Figure 9:
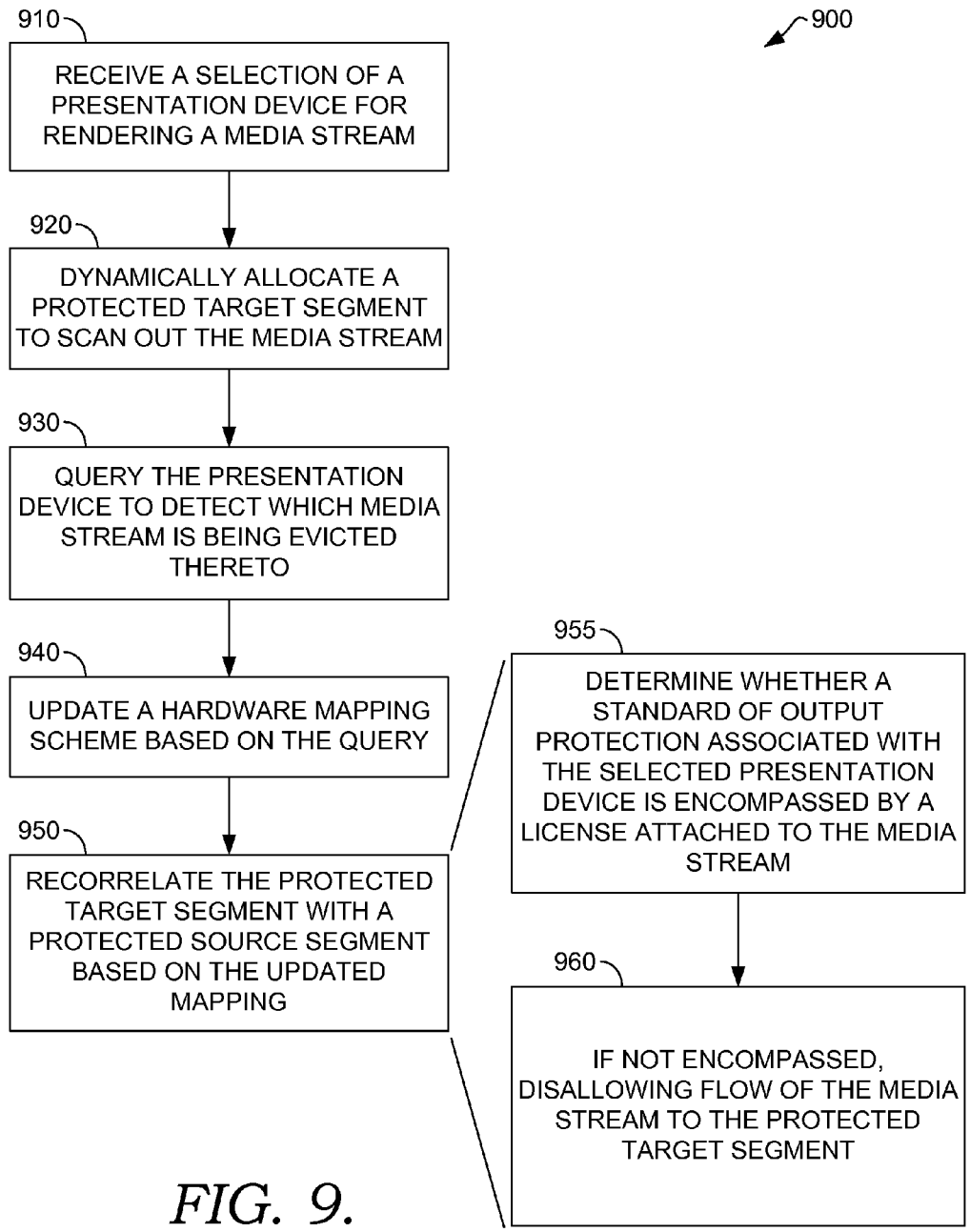
FIG. 9 is a flow diagram illustrating a method for updating a hardware mapping scheme based on a reconfiguration of one or more presentation devices, in accordance with embodiments of the present invention.

Referring to FIG. 9, a flow diagram that illustrates a method 900 for updating a hardware mapping scheme based on a reconfiguration of one or more presentation devices is shown, in accordance with embodiments of the present invention. Initially, a selection of a presentation device (e.g., by a user) for rendering a media stream is received, as indicated at block 910. As indicated at block 920, a protected target segment is dynamically allocated to scan out the media stream to the selected presentation device. A query may be sent to the presentation device—either continuously, at variable periods, or at regular intervals—to access which presentation device is selected for receiving the media stream, as indicated at block 930. As indicated at block 940, the hardware mapping scheme may be updated if the selected presentation device has switched. In this instance, the protected target segments and the protected source segments are re-correlated to correspond with the updated mapping, as indicated at block 950. Generally, re-collation includes determining whether a standard of output protection associated with the newly selected presentation device is encompassed by a license attached to the media stream (see block 955), and disallowing flow of the media stream to the protected target segment if the standard of output protection is not encompassed by the license (see block 960).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for protecting secure data by writing content of the secure data to a protected memory segment, the method comprising:
   receiving streaming media from a media-reading device;
   identifying portions of the streaming media as secure data;
   allocating a region of memory to provide the protected memory segment to accept the identified secure data, wherein the protected memory segment represents a secure data store that restricts access from the operating system thereto utilizing a set of hardware-based rules instantiated for the secure data store, wherein allocating the region of memory to provide the protected memory segment comprises:
      (a) incident to identifying portions of the streaming media as secure data, establishing the protected memory segment;
      (b) determining a rate of flow of the streaming media; and
      (c) dynamically manipulating the allocation of the region of memory to hold the protected memory segment as a function of the rate of flow, wherein dynamically manipulating comprises incrementally growing or incrementally shrinking the protected memory segment in accordance with changes to the rate of flow; and
   at least temporarily storing content of the secure data at the protected memory segment, wherein the stored content is not encrypted; and
   releasing the content from the protected memory segment for conveyance to one or more presentation devices, wherein releasing the content from the protected memory segment comprises:
      (a) pushing the content to a frame buffer according to a rate of flow of the streaming media, wherein the content in the frame buffer is visible to the one or more presentation devices and is protected by the set of hardware-based rules; and
      (b) scanning out the content to the one or more presentation devices for rendering thereby.

2. The one or more computer-storage media of claim 1, wherein the allocated region of memory comprises at least one of system memory, video memory, or a combination of the system memory and the video memory.

3. The one or more computer-readable media of claim 2, wherein allocating the region of memory to provide the protected memory segment to accept the secure data comprises:
   initially selecting the video memory as the region of memory that is provided for the protected memory segment;
   detecting an increase in the rate of flow of the streaming media; and
   dynamically expanding the region of memory that is allocated for the protected memory segment to include the system memory.

4. The one or more computer-storage media of claim 1, the method further comprising:
   recognizing a type of the one or more presentation devices; and
   applying output protection according the type of the one or more presentation devices.

5. The one or more computer-storage media of claim 1, wherein restricting access from the operating system to the protected memory segment utilizing the set of hardware-based rules comprises:
   receiving an indication of an attempt to read from the protected memory segment by an unauthorized source; and
   altering the content to provide a null presentation when rendered on the one or more presentation devices.

6. The one or more computer-storage media of claim 1, wherein restricting access from the operating system to the protected memory segment utilizing the set of hardware-based rules comprises:
   determining whether the content is being encrypted during the release for conveyance to the one or more presentation devices; and
   altering the content to provide a null presentation when rendered on the one or more presentation devices.

7. The one or more computer-storage media of claim 1, wherein restricting access from the operating system to the protected memory segment utilizing the set of hardware-based rules comprises:
   receiving an indication that the content is being illicitly copied from the secure data for storage at a region of memory that is not the protected memory segment; and
   altering the extracted content to provide a null presentation when rendered on the one or more presentation devices.

8. The one or more computer-storage media of claim 1, wherein restricting access from the operating system to the protected memory segment utilizing the set of hardware-based rules comprises:
   receiving an indication the allocation for the protected memory segment is lowered thereby exposing a section of the content temporarily stored to the protected memory segment; and
   corrupting the exposed section of the content to provide a null presentation when rendered on the one or more presentation devices.

9. A computer system for applying a set of hardware-based rules to content that is written to a protected memory segment, the system comprising:
   an application to receive media streaming from a media-reading device and to identify secure data within the streaming media;
   a driver component to specify a type of memory that content of the streaming media is to be written, wherein the type of memory is specified as a function of whether the secure data is identified within the streaming media;
   a memory manager to allocate memory for the protected memory segment to, at least temporarily, store the content of the secure data, wherein the stored content is not encrypted, and wherein the memory manager is further configured to:
(a) determine a rate of flow of the streaming media; and
(b) dynamically allocate a size of the protected memory segment according the rate of flow by identifying a region of the memory;
the protected memory segment to protectively hold the content and to deny unauthorized access from the operating system to the content by enforcing the set of hardware-based rules; and
output-protection component to apply encryption to the content upon releasing the content from the protected memory segment to one or more presentation devices, wherein releasing the content from the protected memory segment comprises:
(a) pushing the content to a frame buffer according to a rate of flow of the streaming media, wherein the content in the frame buffer is visible to the one or more presentation devices and is protected by the set of hardware-based rules; and
(b) scanning out the content to the one or more presentation devices for rendering thereby.

10. The system of claim 9, further comprising the memory to temporarily store the streaming media, wherein the memory comprises at least one of system memory, video memory, or a combination of the system memory and the video memory.

11. The system of claim 9, wherein the driver component and the video memory are embodied on a graphics processing unit (GPU) having hardware distinct from hardware supporting a central processing unit (CPU) that enables function of the memory manager.

12. The system of claim 9, wherein the application comprises a receiving component configured to:
decrypt the secure data;
compress the decrypted secure data; and
encrypt the compressed secure data.

13. The system of claim 12, wherein the application is further comprises a decoder component to:
decrypt the encrypted compressed secure data;
decode the compressed secure data to derive content therefrom; and
populate the protected memory segment allocated for the decoded secure data with the content derived therefrom.

14. The system of claim 9, wherein the output-protection component is further configured to:
identify at least one output from which the content passing through the protected memory segment is being evicted;
determine a type of the one or more presentation devices operably connected to the at least one output; and
apply encryption to the content according to the type of the one or more presentation devices precedent to the eviction of the content.

15. The system of claim 9, wherein the streaming media is a video stream, wherein the media-reading device is a digital versatile disc (DVD) player, and wherein the content is digital video content that is displayed on the one or more presentation devices when rendered.

16. A computerized method for managing dynamic allocation of regions of memory to provide protected memory segments for storing secure data, the method comprising:
receiving streaming media from a first media-reading device;
identifying a rate of flow of the streaming media;
identifying secure data is included within the streaming media;
instantiating a first protected memory segment for receiving the secure data from the first media-reading device, wherein the first protected memory segment conditionally limits access to the secure data residing therein;
dynamically allocating the regions of memory to provide the first protected memory segment based on the rate of flow, wherein the memory comprises video memory and system memory, and wherein dynamically allocating the regions of memory comprises:
(a) accessing the identified rate of flow of the streaming media; and
(b) dynamically modifying a size of the protected memory segment according the identified rate of flow, wherein the protected memory segment is provisioned to protectively hold the secure data of the streaming media and to deny unauthorized access from the operating system to the secure data by enforcing a set of hardware-based rules;
writing the secure data to the first protected memory segment, wherein content of the written secure data is not encrypted; and
releasing the secure data from the first protected memory segment for conveyance to one or more presentation devices, wherein releasing comprises:
(a) pushing the content to a frame buffer according to a rate of flow of the streaming media, wherein the content in the frame buffer is visible to the one or more presentation devices and is protected by the set of hardware-based rules;
(b) recognizing a type of the one or more presentation devices receiving the streaming media;
(c) applying encryption to the content according the type of the one or more presentation devices; and
(d) scanning out the encrypted content to the one or more presentation devices for rendering thereby.

17. The method of claim 16, further comprising:
receiving streaming media from a second media-reading device;
identifying a rate of flow of the streaming media and that secure data is included therein;
instantiating a second protected memory segment for receiving the secure data from the second media-reading device, wherein the second protected memory segment conditionally limits access to the secure data residing therein;
dynamically allocating the regions of memory to provide the second protected memory segment based on the rate of flow and the allocated memory provided for the first protected memory segment;
writing the secure data to the second protected memory segment; and
releasing the secure data from the second protected memory segment for conveyance to one or more presentation devices.

* * * * *